(12) United States Patent
Olgesby et al.

(10) Patent No.: US 10,962,360 B2
(45) Date of Patent: Mar. 30, 2021

(54) SMARTPHONE CALIBRATION OF A GRADE CONTROL SYSTEM FOR A WORK MACHINE

(71) Applicant: Deere & Company, Moline, IL (US)

(72) Inventors: Madeline T Olgesby, Asbury, IA (US); Cory J. Brant, Hazel Green, WI (US); Christopher R. Benson, Dubuque, IA (US)

(73) Assignee: Deere & Company, Moline, IL (US)

( * ) Notice: Subject to any disclaimer, the term of this patent is extended or adjusted under 35 U.S.C. 154(b) by 400 days.

(21) Appl. No.: 16/005,143

(22) Filed: Jun. 11, 2018

(65) Prior Publication Data

US 2019/0376786 A1   Dec. 12, 2019

(51) Int. Cl.
  *G01B 21/04* (2006.01)
  *E02F 9/26* (2006.01)
  *E02F 3/43* (2006.01)

(52) U.S. Cl.
  CPC ............ *G01B 21/042* (2013.01); *E02F 3/435* (2013.01); *E02F 9/264* (2013.01)

(58) Field of Classification Search
  None
  See application file for complete search history.

(56) References Cited

U.S. PATENT DOCUMENTS

| | | | |
|---|---|---|---|
| 6,968,241 B2 * | 11/2005 | Vonnoe | E02F 3/432 340/684 |
| 9,348,327 B2 | 5/2016 | Mizuochi et al. | |
| 9,959,581 B2 * | 5/2018 | Pershing | G06Q 10/10 |
| 10,586,349 B2 * | 3/2020 | Li | G06K 9/6201 |
| 2003/0110005 A1 * | 6/2003 | Corcoran | G01C 7/04 702/167 |
| 2004/0210371 A1 | 10/2004 | Adachi et al. | |
| 2005/0197756 A1 * | 9/2005 | Taylor | E02F 3/847 701/50 |
| 2008/0134547 A1 * | 6/2008 | Kliffken | E02F 3/435 37/347 |

(Continued)

FOREIGN PATENT DOCUMENTS

| | | |
|---|---|---|
| DE | 19815894 A1 | 10/1998 |
| DE | 112016003502 T5 | 5/2018 |

(Continued)

OTHER PUBLICATIONS

Russian Search Report issued in counterpart application No. 2019113977 dated Apr. 27, 2020 (02 pages).

(Continued)

*Primary Examiner* — Lina M Cordero
(74) *Attorney, Agent, or Firm* — Christopher R. Christenson; Kelly, Holt & Christenson PLLC

(57) ABSTRACT

A method of calibrating a grade control system is provided. The method includes placing a smartphone on first defined calibration location of a work machine. The smartphone determines a slope of the first defined calibration location relative to gravity. The smartphone is placed on a second defined calibration location of the work machine and determines a slope of the second defined calibration location relative to gravity. The slope of the first and second defined calibration locations is automatically communicated to the grade control system and is employed for subsequent grade control.

20 Claims, 11 Drawing Sheets

(56) References Cited

U.S. PATENT DOCUMENTS

| | | |
|---|---|---|
| 2010/0157283 A1* | 6/2010 | Kirk .................. G01C 15/002 356/28 |
| 2011/0178677 A1 | 7/2011 | Finley et al. |
| 2012/0099955 A1* | 4/2012 | Glitza .................. G01C 9/06 414/687 |
| 2012/0201640 A1* | 8/2012 | Jessen .................. E02F 9/2203 414/694 |
| 2015/0355786 A1 | 12/2015 | Sabatelli et al. |
| 2016/0054114 A1 | 2/2016 | Crozier et al. |
| 2017/0292248 A1 | 10/2017 | Matson et al. |

FOREIGN PATENT DOCUMENTS

| | | |
|---|---|---|
| RU | 2599178 C2 | 10/2016 |
| WO | 2014146809 A | 9/2014 |

OTHER PUBLICATIONS

German Search Report issued in counterpart application No. 102019206819.7 dated Mar. 25, 2020 (8 pages).

\* cited by examiner

SMARTPHONE CALIBRATION OF A GRADE CONTROL SYSTEM FOR A WORK MACHINE

BACKGROUND

Various types of work machines use a blade or bucket to work a particular site. For example, an excavator has a bucket that is movable to scoop or otherwise rotate to remove material from a surface (e.g. the ground). Similarly, a grader has a blade that is movable to change the height and angle of the blade. A crawler is generally a tracked machine and has a bucket that can be raised or lowered as well as rotated. These are simply examples of work machines that have a blade or bucket that is movable in multiple degrees of freedom to interact with the work site.

As the work machine encounters different sized loads and resistance, it is useful for the work machine to sense if the blade or bucket needs to have its position corrected. In order to do this, work machines such as those listed above, may include an inertial measurement unit (IMU) that measures the bucket or blade's slope and acceleration for use in grade control. The IMU is a device that includes any combination of accelerometers, gyroscopes, and magnetometers to provide an indication of acceleration and slope relative to a blade or bucket of a work machine.

In order to ensure that the grade control is accurate, the IMU signals must be accurate. Accordingly, these IMUs require calibration to account for internal component variability and the mounting tolerances of the IMU to the frame of the work machine. Currently, the process of calibrating a grade control IMU of a work machine is relatively time consuming and introduces an opportunity for human error.

The discussion above is merely provided for general background information and is not intended to be used as an aid in determining the scope of the claimed subject matter.

SUMMARY

A method of calibrating a grade control system is provided. The method includes placing a smartphone on first defined calibration location of a work machine. The smartphone determines a slope of the first defined calibration location relative to gravity. The smartphone is placed on a second defined calibration location of the work machine and determines a slope of the second defined calibration location relative to gravity. The slope of the first and second defined calibration locations is automatically communicated to the grade control system and is employed for subsequent grade control. A mobile device as well as a work machine having a grade control system are also provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
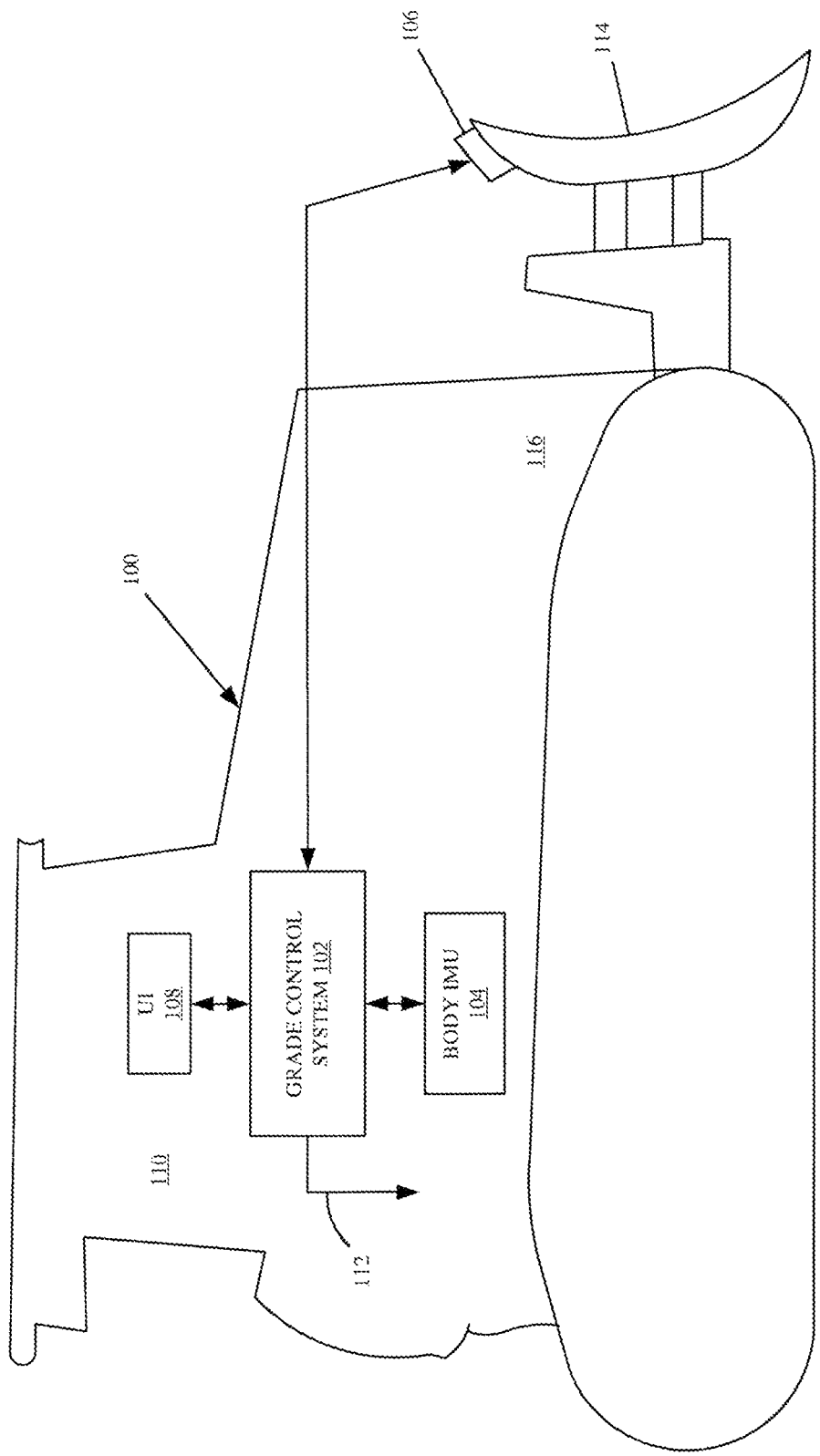
FIG. 1 is a diagrammatic view of an exemplary crawler dozer that utilizes a grade control system with which embodiments described herein are particularly useful.

FIG. 1 is a diagrammatic view of an exemplary crawler dozer 100 that utilizes a grade control system 102. As shown, grade control system 102 is communicatively coupled to body IMU 104, as well as blade IMU 106. Further, grade control system 102 is also coupled to a user interface 108 that is located in the cab 110 of crawler dozer 100. Grade control system 102 can include any combination of processing circuitry, logic circuitry, and software in order to receive inputs from body IMU 104, and blade IMU 106 and generate grade adjustment outputs as indicated at reference numeral 112. These outputs can be provided to one or more suitable hydraulic valve controllers in order to generate compensatory movement in blade 114. The ability for grade control system 102 to sense movement of blade 114 relative to body 116 allows crawler dozer 100 to automatically detect conditions for which automatic adjustments would be beneficial. For example, grade control system 102 may automatically lift and lower blade 114 in response to measured differences between the blade position and the pre-defined grade. Further, it is believed that utilization of grade control system 102 may reduce or otherwise limit the number of passes required for the overall work operation, thereby reducing the pace of wear on the undercarriage of crawler dozer 100.

Figure 2A:
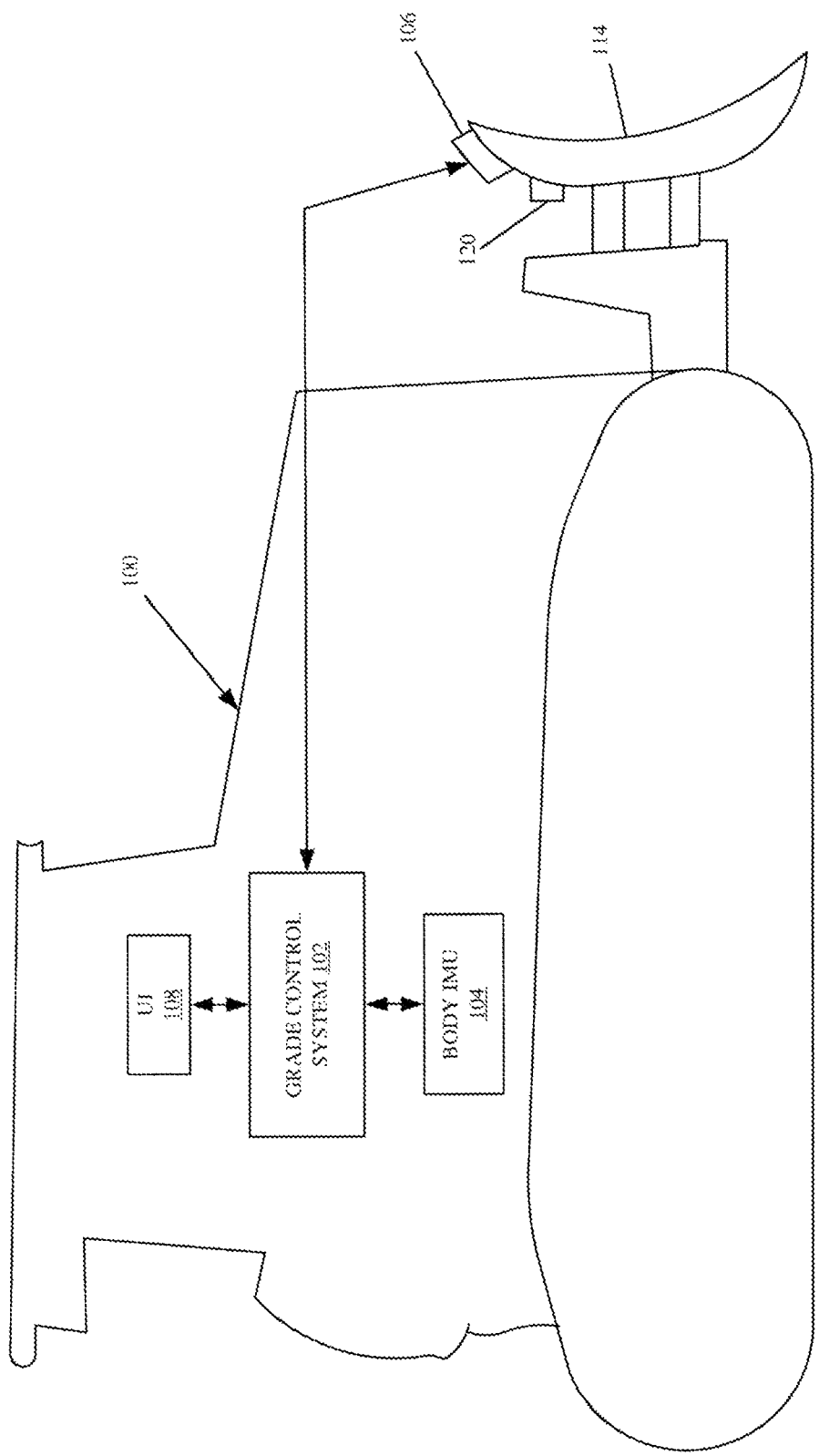
FIGS. 2A-2C illustrates IMU calibration of a smart grade control system.
Figure 2B:
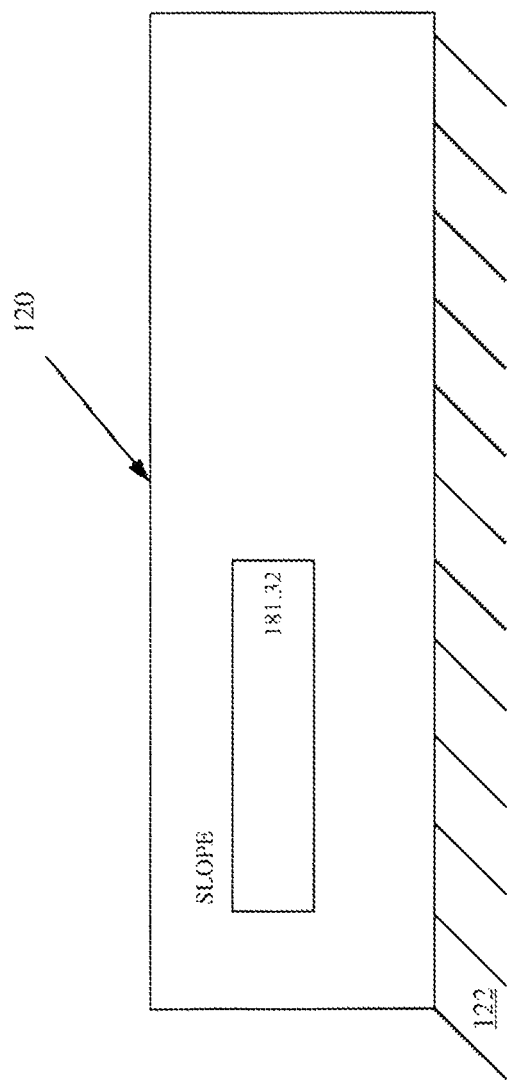
Figure 2C:
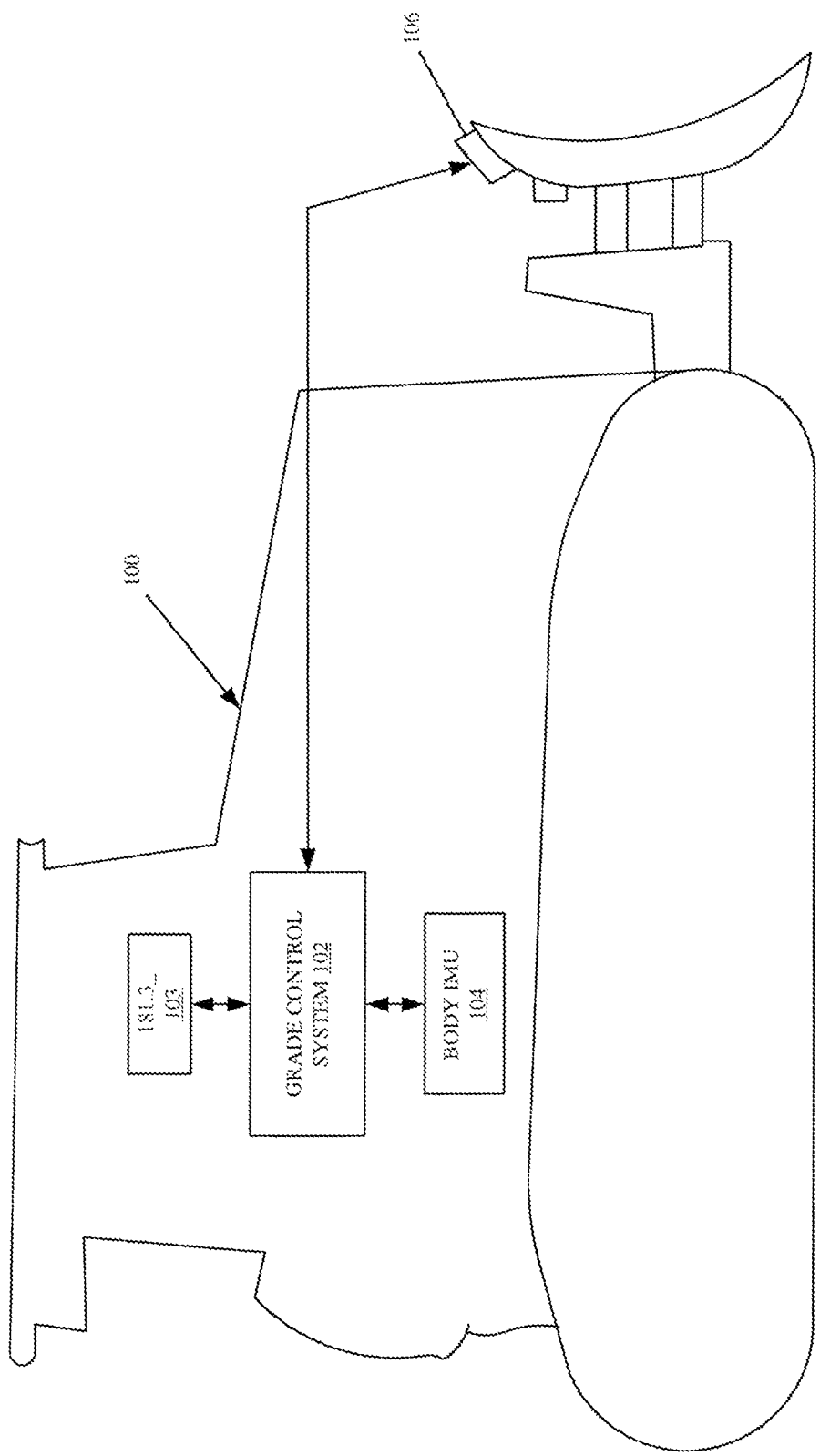

FIG. 2A is a diagrammatic view of crawler dozer 100, when it is necessary to calibrate blade IMU 106. As shown, an external level device, indicated at reference numeral 120, is physically coupled to blade 114. External level device 120 when so coupled, will provide an indication of the slope of the blade at the pre-defined location to which it is coupled. FIG. 2B is a diagrammatic view of external level device 120 indicating a slope (181.32) of the surface 122 upon which it rests. During calibration, grade control system 102 receives IMU signals from body IMU 104, and blade IMU 106. An operator is responsible for entering the indication from external indicator 120 into user interface 108. As shown in FIG. 2C, the user has entered the digits 181.3 into user interface 108. Presumably, the user will complete the data entry by entering a "2". However, as can be appreciated, it is possible for users to enter erroneous information. Further, in order to enter the information into user interface 108, the user must generally move from a location where he or she can visually see the digital indication on external slop indicator 120 into cab 110 in order to interact with user interface 108. Then, once this data entry has been completed, the calibration will continue with the user moving external slope indicator 120 to another pre-defined location on blade 114. Once so positioned, the user will again read the slope information, remember the slope information while entering cab 110 of crawler dozer 100, and input the correct slope information into user interface 108. Accordingly, calibration of blade IMU 106, while required for providing the significant advantages of automatic grade control system 102, entails a relatively labor-intensive process that introduces the potential for human error.

Figure 3:
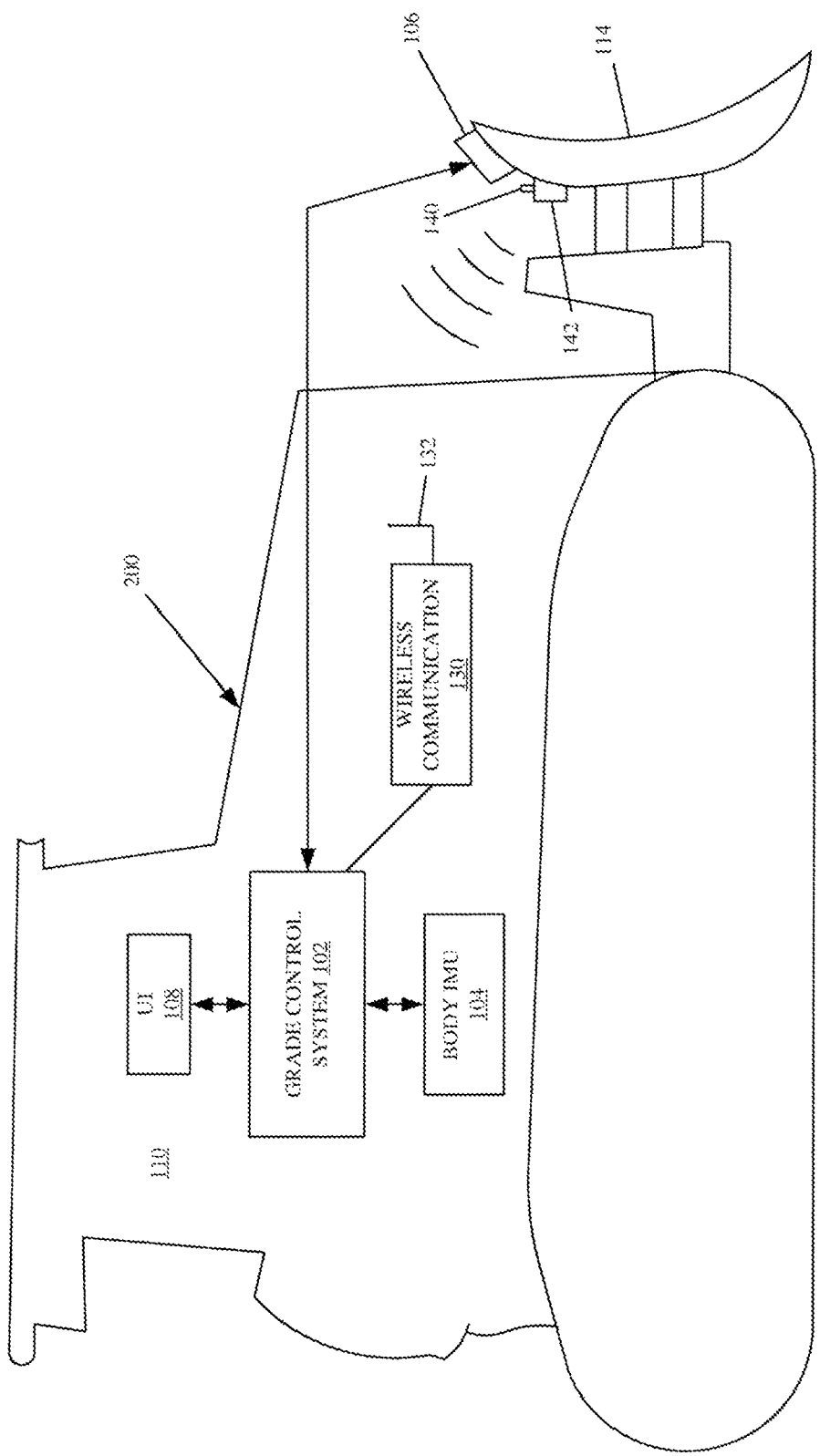
FIG. 3 is a diagrammatic view of a work machine (crawler dozer) in accordance with one embodiment.

FIG. 3 is a diagrammatic view of crawler dozer 200 in accordance with an embodiment of the present invention. While embodiments will be described with respect to calibration of a blade IMU 106, it is expressly contemplated that calibration of body IMU 104 can also be performed in a similar manner. Crawler dozer 200 utilizes many of the same elements as crawler dozer 100, and like components are numbered similarly. The main difference between crawler dozer 200 and crawler dozer 100 is the addition of a wireless communication module 130 that is coupled to grade control system 102. Wireless communication module 130 is coupled to antenna 132 in order to transmit and receive wireless communication. Suitable examples of wireless communication include, without limitation, communication at the unlicensed 2.4 GHz band in accordance with a Bluetooth specification (such as Bluetooth Core Specification 5.0, adopted Dec. 2, 2016—as well as compatible Bluetooth specifications) communication at 2.4 GHz using a wireless fidelity (WiFi) communication protocol (such as IEEE 802.11b, IEEE 802.11g, or others), communication at 5.0 GHz using a WiFi protocol, or others. Preferably, wireless communication module 130 utilizes wireless communication technologies that are able to communicate directly with a user's cellular telephone. Current cellular telephones that communicate in accordance with Bluetooth communication and/or WiFi communication are relatively ubiquitous. However, it is expressly contemplated, that wireless communication module 130 may use any wireless communication technology to communicate either directly or indirectly (e.g., through the Internet) with a user's cellular telephone. As shown in FIG. 3, a user's cellular telephone 140 is disposed within a carriage 142 and mounted at the same pre-defined calibration location as external indicator 120 (shown in FIG. 2A). When so configured, cellular telephone 140 uses its own internal IMU in order to provide an external indication of slope relative to blade 114. Then, either automatically, or upon receiving user input, the slope indication is automatically transmitted wirelessly to wireless communication module 130 which provides the measured slope indication to grade control system 102. Since grade control system 102 is coupled to blade IMU 106 and has received an external indication of slope from phone 140, grade control system 102 can generate compensation parameters in order to compensate information received from blade IMU 106. Further, when it is necessary to move the smartphone/carriage assembly to another pre-defined calibration location on blade 114, such process is more efficient, because the user has not been required to move up into cab 110 and enter the information manually into UI 108. Instead, the user may remain near blade 114 and simply move the smartphone/carriage assembly to the second pre-defined calibration position, in order to begin measuring slope of the second pre-defined calibration position. As can be appreciated, the user is able to move through a number of pre-defined calibration positions and automatically or manually send the measured slope information to grade control system 102 via wireless communication module 130. This vastly reduces the amount of time required in order to calibrate blade IMU 106, while also ensuring that the information is provided accurately to grade control system 102 by reducing the potential for human error since no manual data entry into UI 108 is required.

Figure 4A:
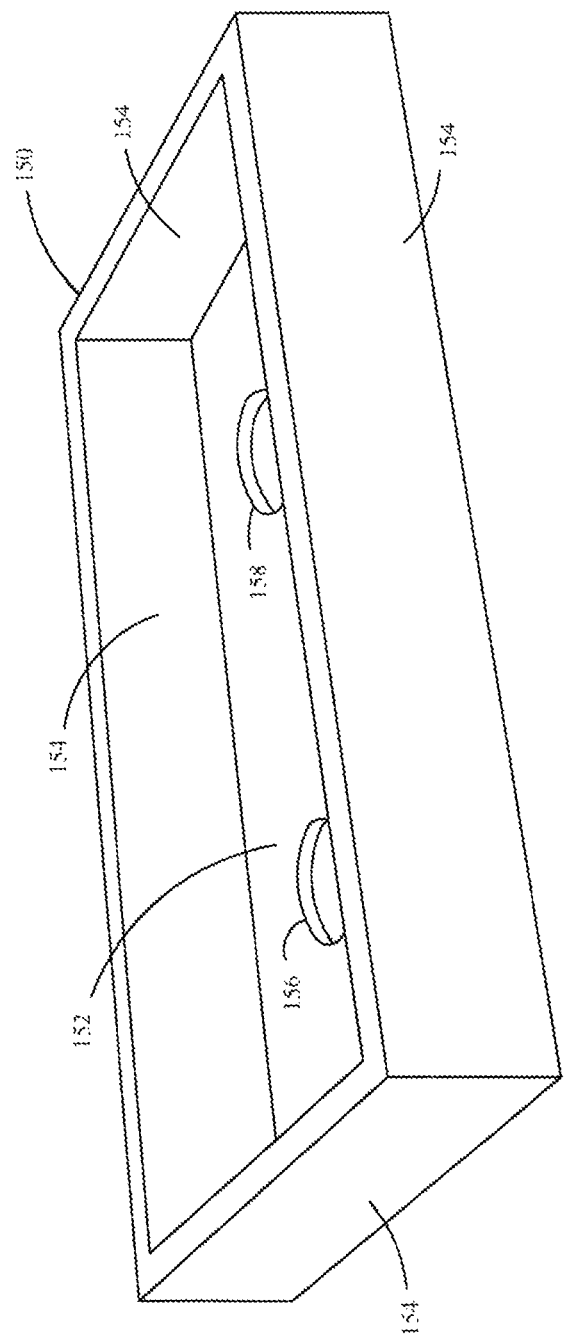
FIG. 4A is a diagrammatic view of a carriage for a smartphone to calibrate a blade IMU in accordance with one embodiment.

FIG. 4A is a diagrammatic view of a carriage 150 for using a smartphone to calibrate a blade IMU in accordance with an embodiment of the present invention. Carriage 150 generally includes a base 152 surrounded by a number of sidewalls 154. In the embodiment illustrated in FIG. 4A, four sidewalls 154 are used. Further, one or more of sidewalls 154 may be designed to be movable in order to accommodate smartphones of different sizes. Further still, additional materials, such as elastomeric foam or other suitable elastomers may be disposed on an internal surface of one or more of sidewalls 154 in order to retain a smartphone placed therein. While various structural modifications to carriage 150 can be performed in order to facilitate clamping or otherwise retaining a smartphone disposed therein, it is important that the plane of the smartphone be reliably maintained relative to base 152. This is because the IMU of the smartphone is used to generate the external slope indication. Additionally, as shown in FIG. 4A, carriage 150 includes one or more features in order to accurately mount to a pre-defined calibration location on the blade of the work machine. In the illustrated embodiment, base portion 152 has a pair of apertures 156, 158 that cooperate with circular protrusions provided on the blade (not shown) at the pre-defined calibration locations in order to accurately mount carriage 150 in the same position and orientation each time the calibration is required. While a pair of apertures 156, 158 are shown, those skilled in the art will appreciate that a variety of cooperative features between carriage 150 and blade 114 can be used in order to reliably and accurately register or position carriage 150 relative to blade 114 when blade IMU calibration is required.

Figure 4B:
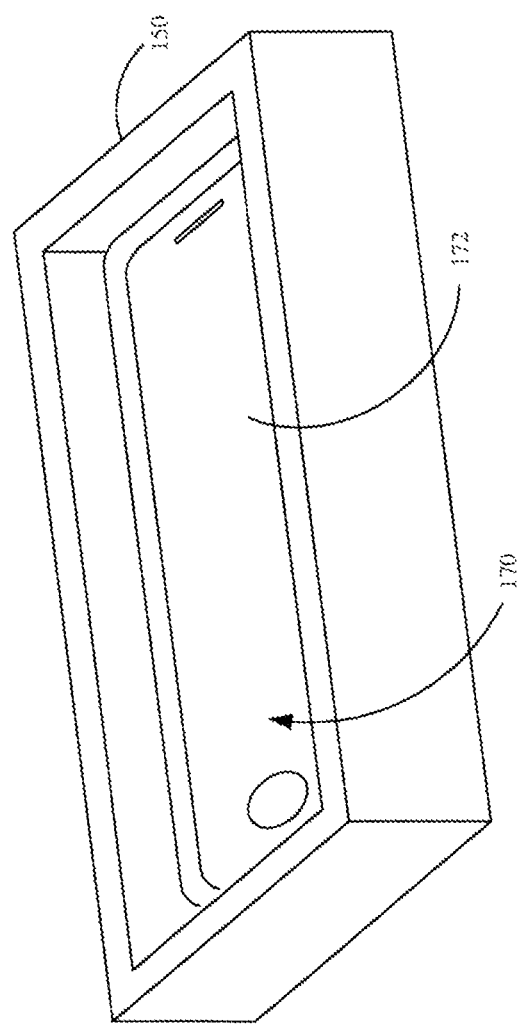
FIG. 4B is a diagrammatic view showing a smartphone retained within a carriage to calibrate a blade IMU in accordance with one embodiment.

FIG. 4B is a diagrammatic view showing a smartphone 170 retained within sidewalls 154 of carriage 150. Additionally, in the embodiment illustrated, smartphone 170 is retained in an orientation that allows the user to interact with screen 172 of smartphone 170. This is a preferred embodiment in that user interaction with the screen of a smartphone is generally a more intuitive interaction. However, it is expressly contemplated that embodiments can be practiced where smartphone 170 responds to voice commands and thus the user need not necessarily interact with screen 172 in order to perform the blade IMU calibrations described herein.

Figure 5:
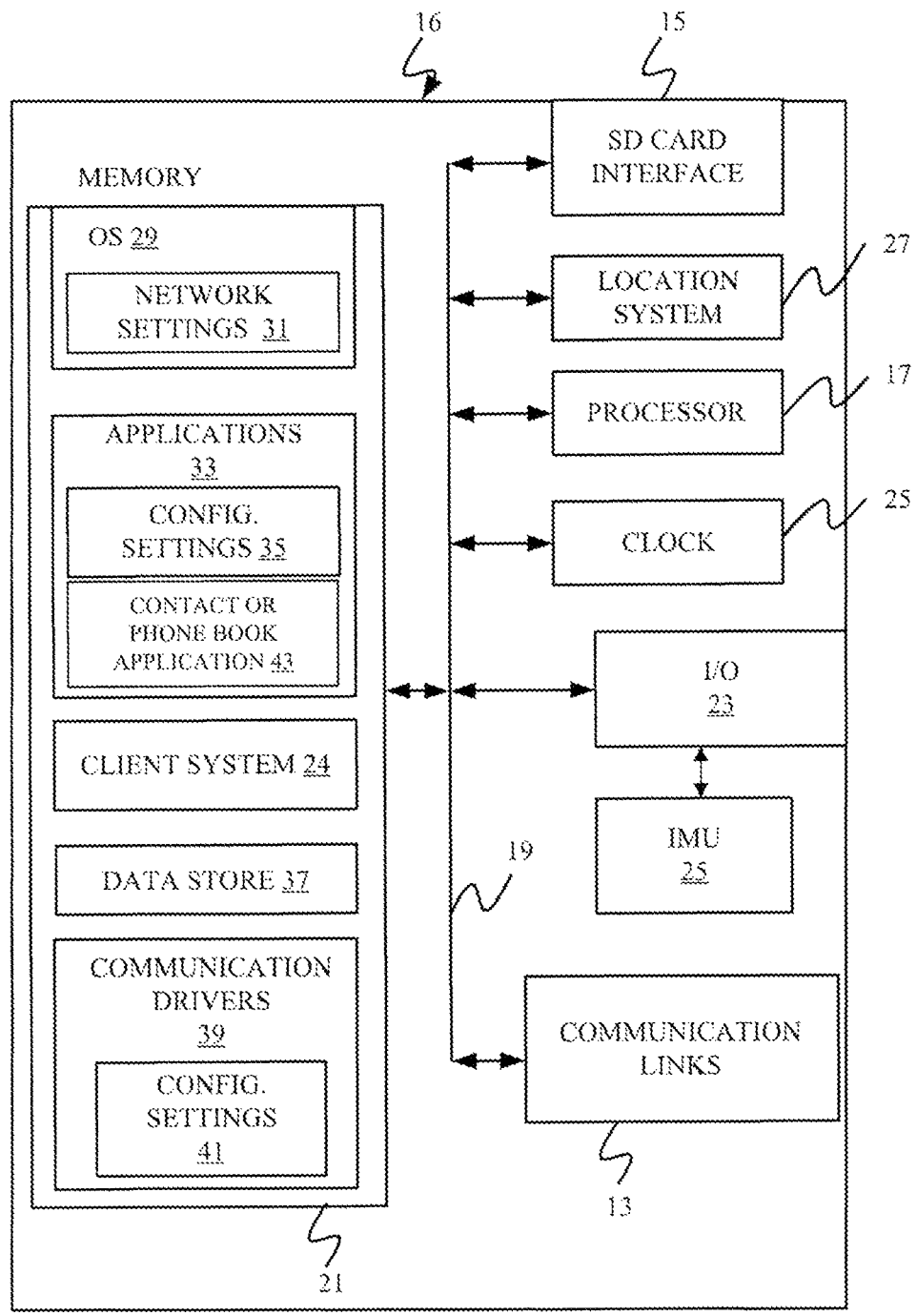
FIG. 5 is a diagrammatic view of an exemplary smartphone with which embodiments described herein are useful.

FIG. 5 is a diagrammatic view of an exemplary mobile device with which embodiments described herein are useful. As shown in FIG. 5, mobile device 16 includes all of the hardware components needed to calibrate a grade control system. In device 16, a communications link 13 is provided that allows the mobile device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks. Examples of such communication include communication in accordance with the Bluetooth specification and/or communication in accordance with a WiFi communication protocol.

Under other embodiments, applications can be received on a removable Secure Digital (SD) card that is connected to an interface 15. Interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well. For example, IMU 25 of mobile device 16 may be operably coupled to processor 17 via I/O components 23.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well. Applications 33 include a smartphone-resident application for calibrating the blade IMU 106 of work machine 200. Thus, when invoked or otherwise engaged, the calibration application guides, or otherwise assists, the user in performing the IMU calibration.

Figure 6:
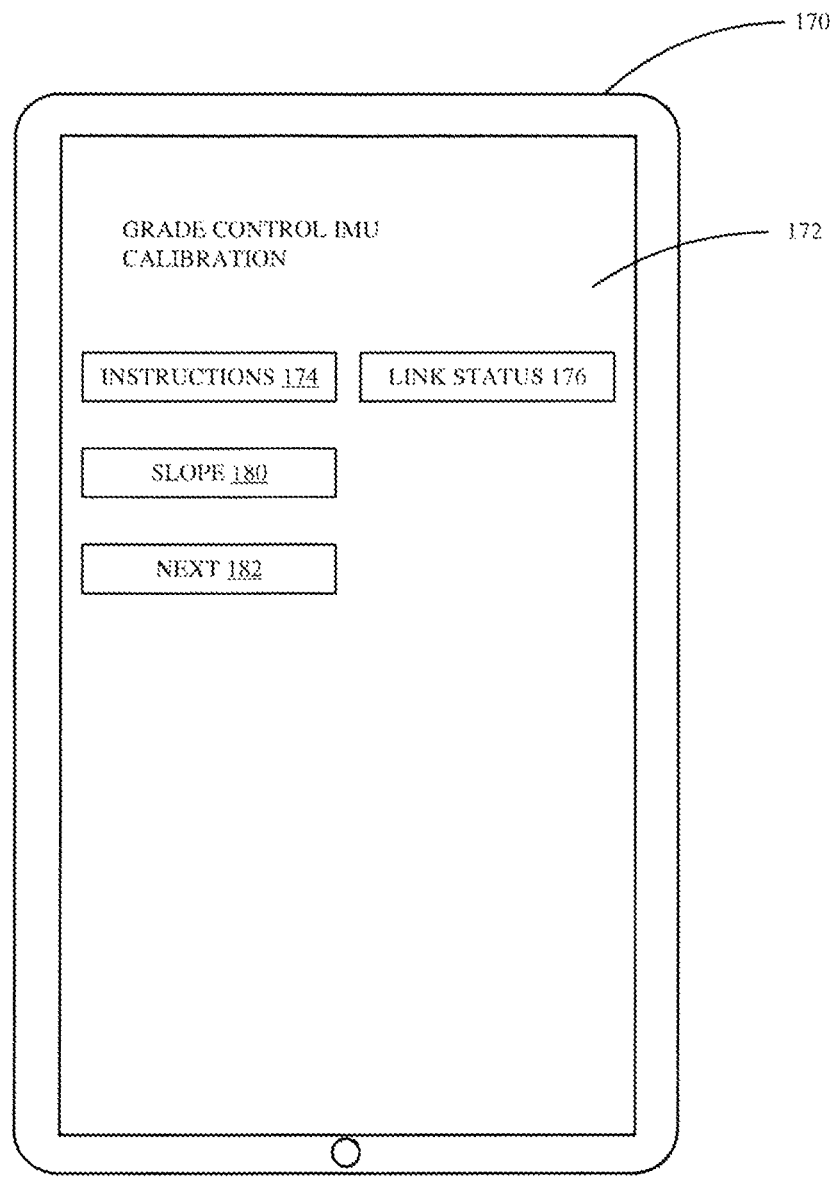
FIG. 6 is a diagrammatic view of a screen of a smartphone during IMU calibration in accordance with an embodiment.

FIG. 6 is a diagrammatic view of a screen of a smartphone during IMU calibration in accordance with an embodiment of the present invention. Smartphone 170 is executing a blade IMU calibration application, described above, as shown on screen 172. In the illustrated example, the calibration application provides one or more instructions 174 to the user. For example, when the calibration application is initially launched, the instructions may require the user to enter cab 110 of the work machine and interact with user interface 108 in order to cause the grade control system to be put into a calibration state where it is receptive to receipt of wireless slope information from smartphone 170. Further, instructions may also include instructing the user to place the smartphone/carriage assembly on a first pre-defined calibration location of blade 114. While the instructions may be entirely textual, it is also expressly contemplated that graphical depictions of the pre-defined calibration locations relative to the blade either of a generic crawler dozer, or of the specific blade of the crawler dozer can be provided.

As shown in FIG. 6, the IMU calibration application may provide an indication 176 relative to its wireless communication link with wireless communication modules 130 of grade control system 102. While embodiments are described generally with respect to information being transmitted wirelessly to wireless communication module 130, if the link, for one reason or another, is inoperative, it is also possible for the grade control calibration application to measure slope at each pre-defined calibration position such that slope is measured for all pre-defined calibration locations and stored by smartphone 170. Then if the link is still unavailable when the user reenters cab 110, smartphone 170 may be connected via any suitable wired connection to grade control system 102 in order to transfer the stored slope information to grade control system 102. Thus, advantages of efficiency and reduction of data entry may still be achievable when no link is available. The calibration application also includes an indication of the currently measured slope 180. Slope indication 180 may also show a progress bar indicating to the user that multiple slope values are currently being measured and the amount of time that will generally be required until an averaged slope value is prepared. Further, the grade control calibration application also generally includes a "next" button 182 that, upon actuation, will transfer the measured slope information to grade control system 102 wirelessly and indicate to the grade control calibration application that the user is ready to move the smartphone/carriage assembly to the next pre-defined calibration position on the blade. This process will repeat until slope has been measured for all pre-defined calibration positions of blade 114 and such slope information has been transferred to grade control system 102 by smartphone 170.

Figure 7:
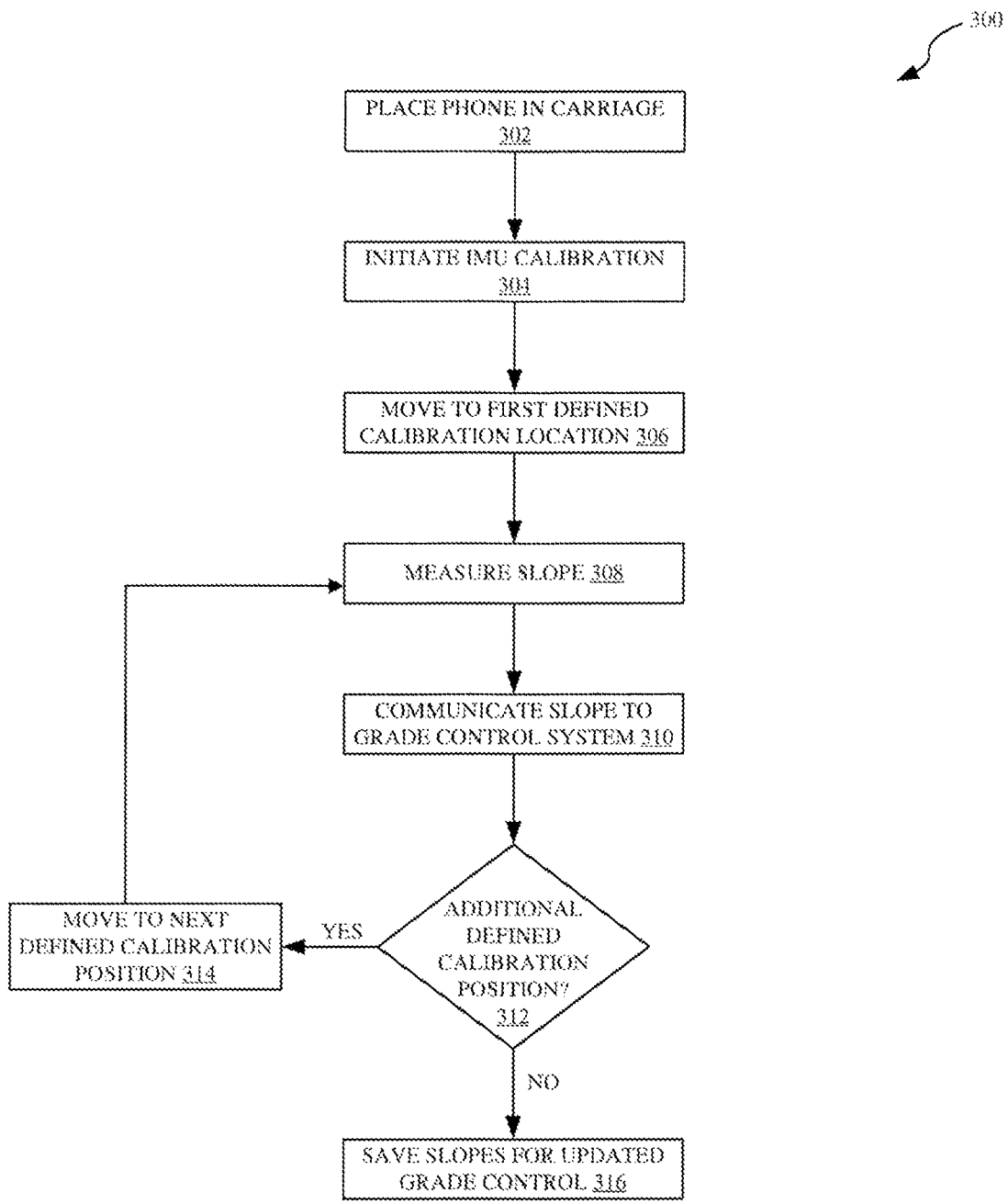
FIG. 7 is a flow diagram of a method of calibrating a grade control system in accordance with an embodiment.

FIG. 7 is a flow diagram of a method of calibrating a grade control system in accordance with an embodiment of the present invention. Method 300 begins at block 302 where a smartphone is placed in a calibration carriage. Next, at block 304, IMU calibration is initiated. In one example, the initiation of IMU calibration is done both via user interface 108 disposed in cab 110 of the work machine, as well as launching or otherwise invoking an IMU calibration application on the smartphone. However, embodiments can be practiced where, upon launch of the calibration application on the smartphone, the smartphone application communicates automatically with wireless communication module 130 of grade control system 102 in order to instruct the grade control system to enter a calibration state. Accordingly, some embodiments can be practiced where the user need not interact directly with UI 108 in order to cause the grade control system 102 to enter the calibration state. Regardless, at block 306, the smartphone/carriage is moved to a first pre-defined calibration location on the blade of the work machine. Once so positioned, method 300 moves to block 308 where the smartphone measures the slope of the first pre-defined calibration location on the blade. Next, at block 310, the measured slope information is communicated to grade control system 102, preferably wirelessly. Further, at block 310, or at any other time during calibration, grade control system 102 will receive IMU information from blade IMU 106. Thus, by comparing the received blade IMU information with the measured slope information communicated from the smartphone, the grade control system generates corrective parameters in order to correct the received blade IMU information in order to match the externally measured slope information from the smartphone. At decision point 312, method 300 determines whether additional pre-defined calibrations positions are required. This determination may be made by the application executing on the user's smartphone, or via wireless communication with grade control system 102 via wireless communication module 130.

If additional pre-defined calibration positions are required, method 300 moves to block 314, where the application indicates to the user that the smartphone/carriage must be moved to the next pre-defined calibration position. As described above, this may be in the form of textual instructions, and/or may include a visual indication of the next pre-defined calibration position on the blade. When the smartphone/carriage assembly is located at the next pre-defined calibration position, the user can indicate such via the smartphone screen, or other suitable input, and method 300 will return to block 308 where slope at the next pre-defined calibration position is measured. In this way, method 300 will iterate through all of the pre-defined calibration positions. As can be appreciated, the user is able to be located near blade 114 during the entire blade IMU calibration procedure. Further, all of the measured slope information is communicated from the smartphone 170 to grade control system 102 without requiring the user to enter any of the measured slope information. In this way, the potential for erroneous input is reduced. If at decision point 312, it is determined that no additional pre-defined calibration positions exist, method 300 proceeds to block 316 where the measured slope information is saved by grade control system 102 and used for updated grade control.

The present discussion has mentioned processors and servers. In one embodiment, the processors and servers include computer processors with associated memory and timing circuitry, not separately shown. They are functional parts of the systems or devices to which they belong and are activated by, and facilitate the functionality of, the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

Figure 8:
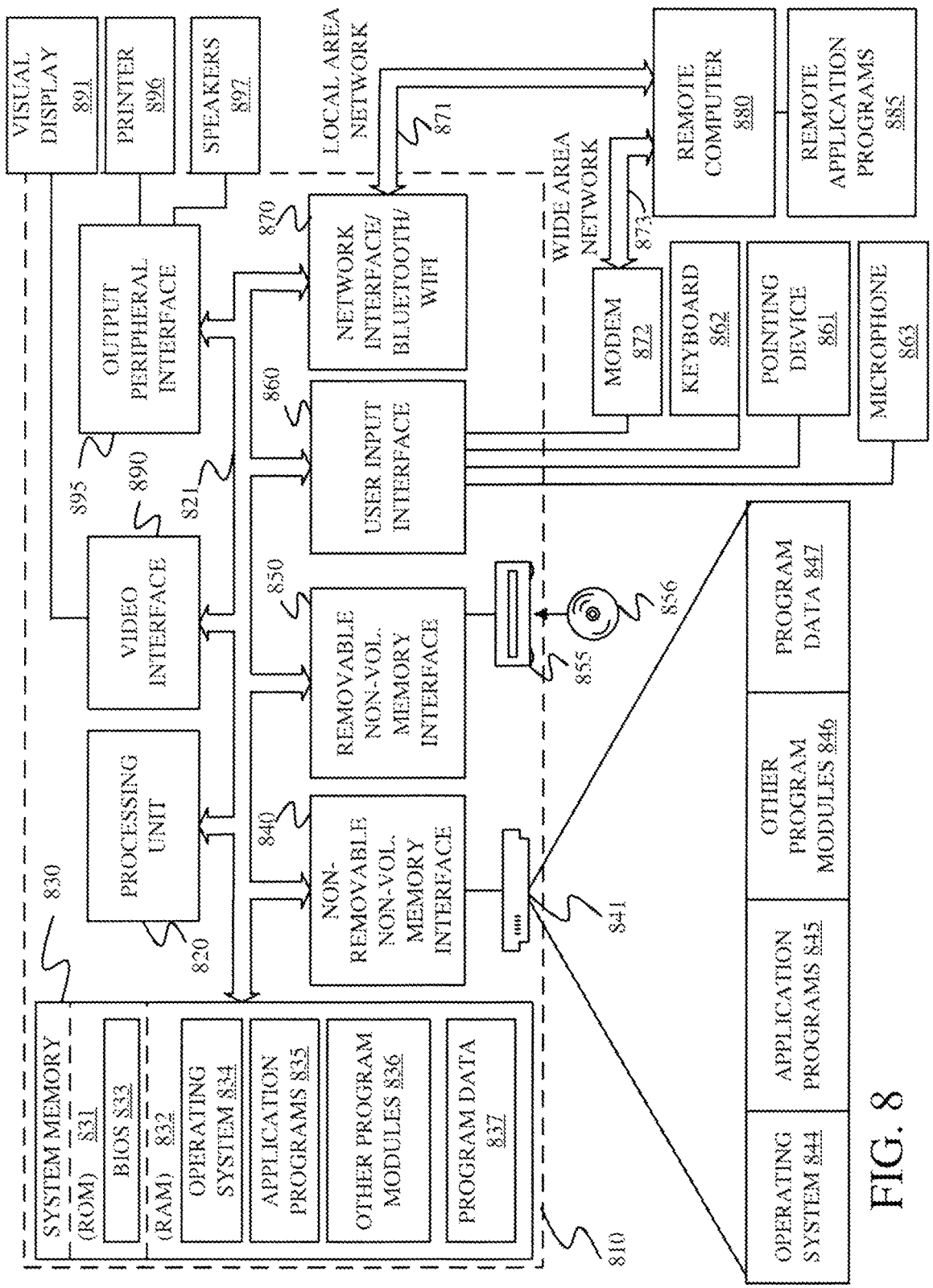
FIG. 8 is a block diagram of a computing environment which may form all or part of a smart grade control system for a work machine.

FIG. 8 is one embodiment of a computing environment in which elements of smart grade control system 102 can be deployed. With reference to FIG. 8, an exemplary system for implementing some embodiments includes a general-purpose computing device in the form of a computer 810. Components of computer 810 may include, but are not limited to, a processing unit 820 (which can comprise processor 108), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851, nonvolatile magnetic disk 852, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment or in embodiments where computer 810 communicates wirelessly, adapter 870 is configured to communicate in accordance with a wireless communication protocol, such as the WiFi communication protocol. Additionally, more than one adapter 870 can be employed in order to allow computer 810 to communicate in accordance with other wireless communication protocols, such as Bluetooth or others. In a networked environment, program modules may be stored in a remote memory storage device. FIG. 8 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a method of calibrating a grade control system, the method comprising:
  placing a smartphone on first defined calibration location of a work machine;
  causing the smartphone to determine a slope of the first defined calibration location relative to gravity;
  placing the smartphone on a second defined calibration location of the grader;
  causing the smartphone to determine a slope of the second defined calibration location relative to gravity;
  automatically communicating the slope of the first and second defined calibration locations to the grade control system; and
  employing the slope of the first and second defined calibration locations for subsequent grade control.

Example 2 is method of calibrating a grade control system of any or all previous examples wherein automatically communicating the slope of the first and second defined calibration locations employs wireless communication.

Example 3 is method of calibrating a grade control system of any or all previous examples wherein the wireless communication has a frequency of about 2.4 GHz.

Example 4 is method of calibrating a grade control system of any or all previous examples wherein the wireless communication is in accordance with a Bluetooth Specification.

Example 5 is method of calibrating a grade control system of any or all previous examples wherein the wireless communication is in accordance with a Wireless Fidelity (WiFi) specification.

Example 6 is method of calibrating a grade control system of any or all previous examples wherein the WiFi specification is IEEE 802.11.

Example 7 is a mobile device comprising:
  a processor;
  a display coupled to the processor and configured to provide a display output;
  a wireless communication transceiver coupled to the processor and configured to wirelessly communicate with a grade control system;
  a slope/tilt sensor operably coupled to the processor and configured to detect slope/tilt of the mobile device relative to gravity;
  memory coupled to the processor and storing instructions that, when executed by the processor, provide a grade calibration application;
  the grade calibration application being configured to:
    receive user input confirming placement of the mobile device on a first defined calibration location;
    in response to receiving user input confirming placement on the first defined calibration location, detect slope of the first defined calibration location using the slope/tilt sensor;
    receive user input confirming placement of the mobile device on a second defined calibration location;
    in response to receiving user input confirming placement on the second defined calibration location, detect slope of the second defined calibration location using the slope/tilt sensor; and
    automatically communicate the first and second detected slope to the grade control system using the wireless communication transceiver.

Example 8 is the mobile device of any or all previous examples and further comprising a display coupled to the processor and configured to provide a display output, the grade calibration application being configured to provide a display output instructing the user to move the mobile device to the second defined calibration location.

Example 9 is the mobile device of any or all previous examples wherein the wireless transceiver is configured to communicate with the grade control system using cellular data services.

Example 10 is the mobile device of any or all previous examples wherein the wireless transceiver is configured to communicate with the grade control system at a frequency of about 2.4 GHz.

Example 11 is the mobile device of any or all previous examples wherein the wireless transceiver is configured to communicate with the grade control system using a Bluetooth specification.

Example 12 is the mobile device of any or all previous examples wherein the wireless transceiver is configured to communicate with grade control system using a Wireless Fidelity (WiFi) specification.

Example 13 is the mobile device of any or all previous examples wherein the grade calibration application is further configured to:
  receive user input confirming placement of the mobile device on a third defined calibration location;
  in response to receiving user input confirming placement on the third defined calibration location, detect slope of the third defined calibration location using the slope/tilt sensor; and
  automatically communicate the third detected slope to the grade control system using the wireless communication transceiver.

Example 14 is a work machine comprising:
  a work blade configured to engage a ground surface, the work blade having a controllable slope;
  a grade control system having an inertial measurement unit, the grade control system being operably coupled to the work blade to control the controllable slope of the work blade; and a wireless communication module configured to receive slope detection information relative to a plurality of defined calibration locations on the work blade and to calibrate the inertial measurement unit based on the received slope detection information.

Example 15 is the work machine of any or all previous examples wherein the wireless communication module is configured to receive the slope detection information from a smartphone.

Example 16 is the work machine of any or all previous examples wherein each defined calibration location on the work blade has features that cooperate with a carriage configured to receive a smartphone.

Example 17 is the work machine of any or all previous examples wherein the carriage is shaped rectangularly and is configured to properly register the smartphone to the work machine.

Example 18 is the work machine of any or all previous examples wherein the plurality of defined calibration locations includes three calibration locations.

Example 19 is the work machine of any or all previous examples wherein the wireless communication module is configured to communicate at about 2.4 GHz.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of calibrating a grade control system, the method comprising:
   placing a smartphone on a first defined calibration location of a work machine;
   causing the smartphone to determine a first slope of the first defined calibration location relative to gravity;
   placing the smartphone on a second defined calibration location of the work machine;
   causing the smartphone to determine a second slope of the second defined calibration location relative to gravity;
   automatically communicating the first slope and the second slope to the grade control system; and
   employing the first slope and the second slope for subsequent grade control.

2. The method of claim 1, wherein automatically communicating the first slope and the second slope employs wireless communication.

3. The method of claim 2, wherein the wireless communication has a frequency of 2.4 GHz.

4. The method of claim 3, wherein the wireless communication is in accordance with a Wireless Fidelity (WiFi) specification.

5. The method of claim 2, wherein the wireless communication is in accordance with a Bluetooth specification.

6. The method of claim 1, wherein the wireless communication is in accordance with a Wireless Fidelity (WiFi) specification.

7. The method of claim 6, wherein the WiFi specification is IEEE 802.11.

8. A mobile device comprising:
   a processor;
   a display coupled to the processor and configured to provide a display output;
   a wireless communication transceiver coupled to the processor and configured to wirelessly communicate with a grade control system;
   a slope/tilt sensor operably coupled to the processor and configured to detect slope/tilt of the mobile device relative to gravity;
   memory coupled to the processor and storing instructions that, when executed by the processor, provide a grade calibration application;
   the grade calibration application being configured to:
      receive a first user input confirming placement of the mobile device on a first defined calibration location;
      in response to receiving the first user input confirming the placement of the mobile device on the first defined calibration location, detect a first slope of the first defined calibration location using the slope/tilt sensor;
      receive a second user input confirming placement of the mobile device on a second defined calibration location;
      in response to receiving the second user input confirming the placement of the mobile device on the second defined calibration location, detect a second slope of the second defined calibration location using the slope/tilt sensor; and
      automatically communicate the first sloe and the second slope to the grade control system using the wireless communication transceiver.

9. The mobile device of claim 8, wherein the grade calibration application is configured to provide the display output instructing a user to move the mobile device to the second defined calibration location.

10. The mobile device of claim 8, wherein the wireless transceiver is configured to communicate with the grade control system using cellular data services.

11. The mobile device of claim 8, wherein the wireless transceiver is configured to communicate with the grade control system at a frequency of 2.4 GHz.

12. The mobile device of claim 11, wherein the wireless transceiver is configured to communicate with the grade control system using a Bluetooth specification.

13. The mobile device of claim 11, wherein the wireless transceiver is configured to communicate with the grade control system using a Wireless Fidelity (WiFi) specification.

14. The mobile device of claim 11, wherein the grade calibration application is further configured to:
   receive a third user input confirming placement of the mobile device on a third defined calibration location;
   in response to receiving the third user input confirming the placement of the mobile device on the third defined calibration location, detect a third slope of the third defined calibration location using the slope/tilt sensor; and
   automatically communicate the third slope to the grade control system using the wireless communication transceiver.

15. A work machine comprising:
   a work blade configured to engage a ground surface, the work blade having a controllable slope;
   a grade control system having an inertial measurement unit, the grade control system being operably coupled to the work blade to control the controllable slope of the work blade; and
   a wireless communication module configured to receive slope detection information relative to a plurality of defined calibration locations on the work blade and to calibrate the inertial measurement unit based on the received slope detection information.

16. The work machine of claim 15, wherein the wireless communication module is configured to receive the slope detection information from a smartphone.

17. The work machine of claim 15, wherein each defined calibration location on the work blade has features that cooperate with a carriage configured to receive a smartphone.

18. The work machine of claim 17, wherein the carriage is shaped rectangularly and is configured to properly register the smartphone to the work machine.

19. The work machine of claim 18, wherein the plurality of defined calibration locations includes three calibration locations.

20. The work machine of claim 15, wherein the wireless communication module is configured to communicate at 2.4 GHz.

\* \* \* \* \*